United States Patent [19]
Ting et al.

[11] Patent Number: 6,037,084
[45] Date of Patent: Mar. 14, 2000

[54] METHOD OF MAKING A COLOR FILTER PLATE WITH MULTI-GAP FOR LCD

[75] Inventors: Dai-Liang Ting; Yong-Hong Lu, both of Hsinnchu, Taiwan

[73] Assignee: Industrial Technology Research Institute, Hsinchu Hsien, Taiwan

[21] Appl. No.: 09/133,516

[22] Filed: Aug. 12, 1998

[51] Int. Cl.[7] ................................................ G02F 1/1335
[52] U.S. Cl. .............................. 430/7; 430/321; 430/394; 349/107
[58] Field of Search ............................... 430/7, 321, 394; 349/107

[56] References Cited

U.S. PATENT DOCUMENTS 4,632,514  12/1986  Ogawa et al. ........................... 349/160

FOREIGN PATENT DOCUMENTS 7-104282  4/1995  Japan .

OTHER PUBLICATIONS

Research Disclosure 40987, "One Resist Layer with Several Functions Using Different Thickness in Pearl–less LCD", May 1998.

*Primary Examiner*—John A. McPherson
*Attorney, Agent, or Firm*—McDermott, Will & Emery

[57] ABSTRACT

The method includes patterning red, green and blue pixels (R, G, B) on a substrate. A transparent positive type photoresist is coated on the color pixels. A first exposure is performed by an illumination using a photomask having an opening aligned to the red pixels (R). Next, the photomask is relatively shift to a position such that the opening is aligned to the green pixels (g). Then, a second exposure is carried out to expose the positive photoresist. Similarly, the photomask is also shift such that the opening is aligned to the blue pixels. Subsequently, the positive photoresist is exposed by the illumination by using the photomask. The positive photoresist is exposed by controlling the intensity of the illumination, exposure time or the combination thereof. Then, the positive photoresist is developed by conventional manner. Subsequently, a color filter plate with multi-gap for LCD is formed.

11 Claims, 3 Drawing Sheets

METHOD OF MAKING A COLOR FILTER PLATE WITH MULTI-GAP FOR LCD

FIELD OF THE INVENTION

The present invention relates to a method of making liquid crystal display, and more specifically, to a method of forming a color filter plate for a thin film transistor-liquid crystal display.

BACKGROUND OF THE INVENTION

Thin film transistor-liquid crystal display (TFT-LCD) is known as the display required for the high pixel density and quality. In general, the TFT-LCD includes a bottom plate formed with thin film transistors and pixel electrodes and a top plate formed with color filters. The liquid crystal is filled between the top plate and the bottom plate. In each unit pixel, a capacitor and a further capacitor are provided which are formed by virtue of the TFT serving as the switching element of the unit pixel. In the operation, a gate signal voltage is applied to the TFT that is the switching element of each unit pixel. The TFT receives the gate signal voltage, it is turn on so that data voltage carrying image information can be applied to the corresponding pixel electrode and the liquid crystal via the TFT. When the data voltage is applied to the TFT, the arrangement of the liquid crystal moleculers is change, thereby changing the optical properties and displaying the image.

A color filter (CF) plate is used in the LCD to show the colored portion of the screen. In general, the viewing angle and the color performance are affected by the design of the color filter. Multi-gap structure is widely used to making the color filter plate for LCD and it has been applied in TN (TFT) and OCB (optical compensation bend) mode. FIG. 1 shows a conventional multi-gap LCD. In the structure, red, blue and green pixels are respectively formed on a glass 2. A first photoresist 4 is formed on the green and the blue pixels. Further, a second photoresist 6 is only formed on the top of the blue pixel. Between the glass 2 and a further glass 8 is liquid crystal 10. Thus, the gap spacing dR, dG and dB are difference. Namely, the color filter plate has a multi-gap structure.

Typically, $\Delta$ nd/$\lambda$ is designed to minimize or maximize the transmission, wherein the n is the integer number, the d is the gap spacing between the glass 8 and the color pixels, $\lambda$ indicates the wavelength of light. Thus, the red pixel has the largest $\Delta$ nd, and the blue pixel has the smallest $\Delta$ nd in the three color pixels. The object of the multi-gap structure is to keep the constant $\Delta$ nd/$\lambda$ value. However, the proces for forming above structure needs at least two photoresist coating and two patterning steps.

SUMMARY OF THE INVENTION

A method is disclosed to form a color filter plate for TFT-LCD. The method includes patterning red, green and blue pixels (R, G, B) on a substrate. A transparent positive type photoresist is coated on the R, G, B pixels. A first exposure is performed by an illumination using a photomask having an opening aligned to the red pixels (R). Next, the photomask is relatively shift to a position such that the opening is aligned to the green pixels (g). Then, a second exposure is carried out to expose the positive photoresist. Similarly, the photomask is also shift such that the opening is aligned to the blue pixels. Subsequently, the positive photoresist is exposed by the illumination by using the photomask. The positive photoresist is exposed by controlling the intensity of the illumination, exposure time or the combination thereof. In detail, the first exposure has the highest illumination intensity, the third exposure has the lowest illumination intensity. The second exposure thus exhibits intermediate intensity of illumination. Another way is to control the time of exposure. That is the exposure time of the first exposure is the longest, while the one of the third exposure is the shortest. The second exposure thus exhibits intermediate time of exposure.

Then, the positive photoresist is developed by conventional manner. The result of the present invention after the three exposure steps is a color filter plate having a multi-gap structure. Finally, an indium tin oxide (ITO) layer, liquid crystal, a alignment film, a further ITO and a further glass are respectively formed by conventional technology.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
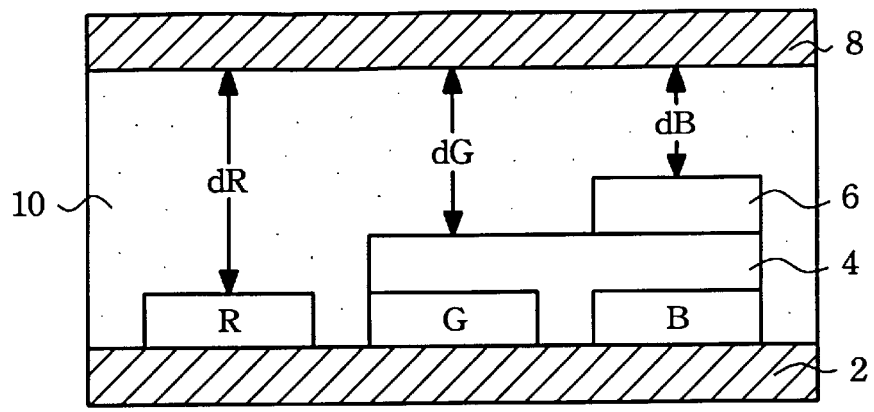
FIG. 1 is cross sectional views of a LCD illustrating the structure of a color filter plate in accordance with the prior art.
Figure 2:
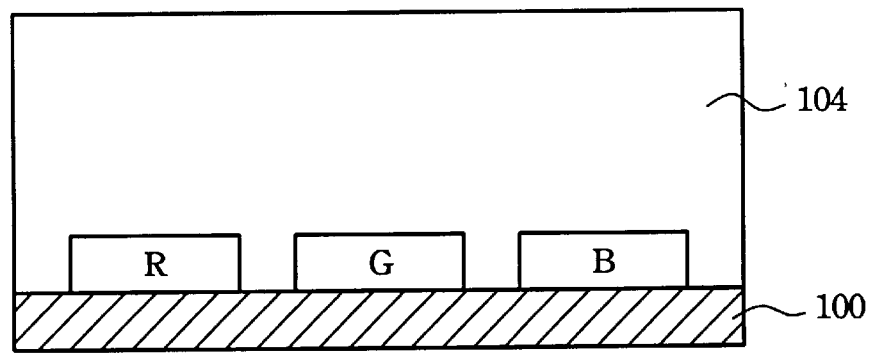
FIG. 2 is a cross sectional view of a LCD illustrating the step of forming color pixels in accordance with the present invention.

A method is disclosed to form a color filter plate for TFT-LCD. The present invention needs only one photoresist coating and one photomask. As will be seen below, this technique can be used for the formation of a TFT device. Referring to FIG. 2, in the preferred embodiment, a substrate 100 formed of glass, quartz or the like is used as an insulating transparent substrate. Red, green and blue pixels (R, G, B) are patterned on the substrate 100 by using conventional manner. Generally, these color pixels are formed of resin.

Subsequently, still referring to FIG. 2, a transparent positive type photoresist 104 is coated on the color pixels. As well known in the art, the characteristic of the negative photoresist is opposite to the one of the positive photoresist. Next steps are used to create a multi-level structure formed in the photoresist. It can be controlled by multi-step of exposure procedure by controlling the illumination intensity and exposure time. The photoresist can be exposed with three difference intensities of an illumination such that regions of the photoresist respectively on said red pixel, said green pixel and said blue pixel are exposed by difference intensity. Then, the photoresist is developed to form a multi-level structure on the color pixels due to different exposure intensity.

Alternatively, the procedures includes exposing the photoresist with three difference exposure time such that regions of said photoresist respectively on the color pixels are exposed by difference time. The embodiment can be seen as follow.

Figure 3:
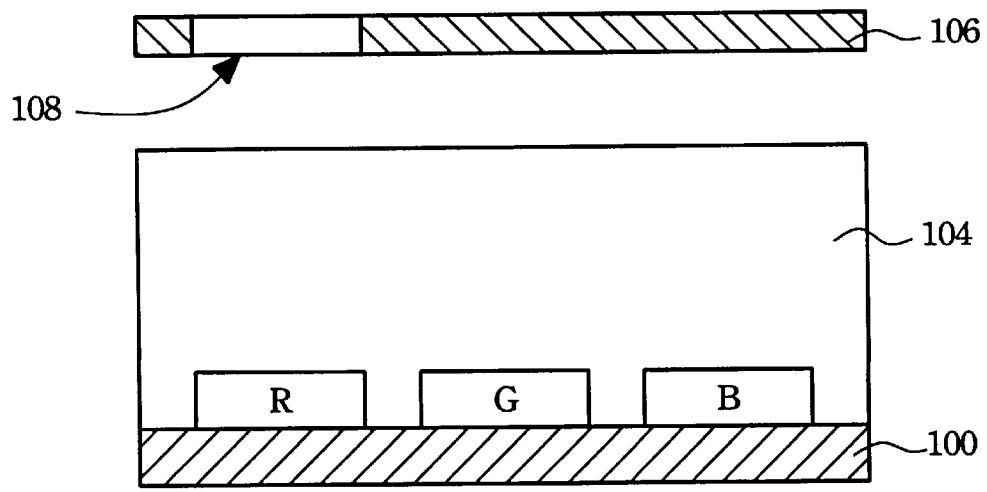
FIG. 3 is a cross sectional view of a color filter plate illustrating the step of performing a first exposure in accordance with the present invention.
Figure 4:
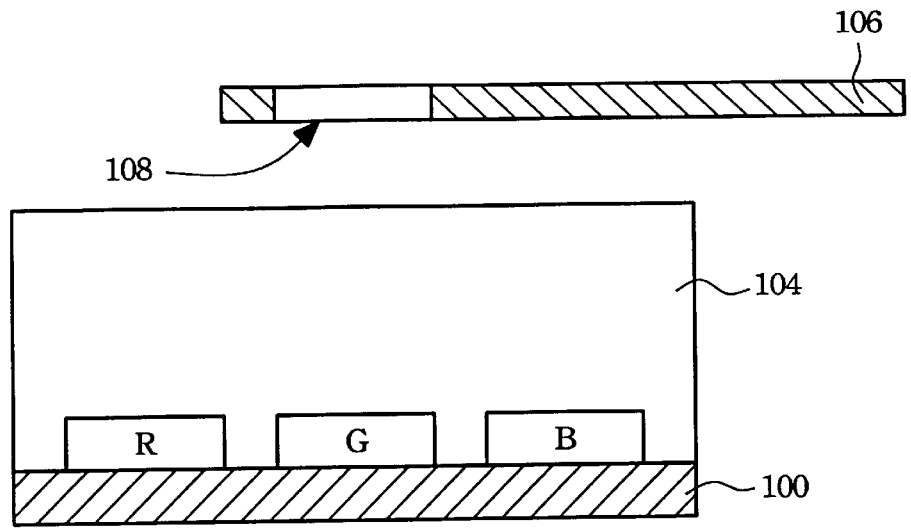
FIG. 4 is a cross sectional view of a color filter plate illustrating the step performing a second exposure in accordance with the present invention.

Turning to FIG. 3, a first exposure is performed by an illumination using a photomask 106 having an opening 108 aligned to the red pixels (R). Next, the photomask 106 is relatively shift to a position such that the opening 108 is aligned to the green pixels (g), as shown in FIG. 4. Then, a second exposure is carried out to expose the positive photoresist 104. The illumination will expose the photoresist 104 through the opening 108 as known in the art.

Figure 5:
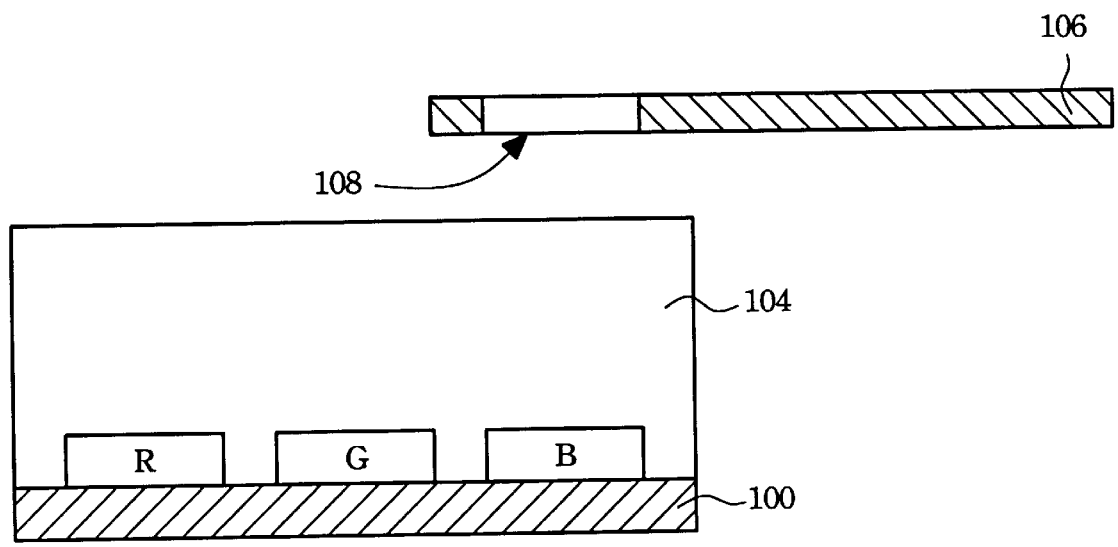
FIG. 5 is a cross sectional view of a color filter plate illustrating the step of performing a third exposure in accordance with the present invention.

Referring to FIG. 5, similarly, the photomask 106 is also shift such that the opening 108 is aligned to the blue pixels (B). Subsequently, the positive photoresist 104 is exposed by the illumination by using the photomask 106. The key of the present invention is that the three exposure steps are respectively performed with difference level of exposure. In order to achieve this, the positive photoresist 104 is exposed by controlling the intensity of the illumination, exposure time or the combination thereof. In detail, the first exposure has the highest illumination intensity, the third exposure has the lowest illumination intensity. The second exposure thus exhibits intermediate intensity of illumination. Another way is to control the time of exposure. That is the exposure time of the first exposure is the longest, while the one of the third exposure is the shortest. The second exposure thus exhibits intermediate time of exposure.

Figure 6:
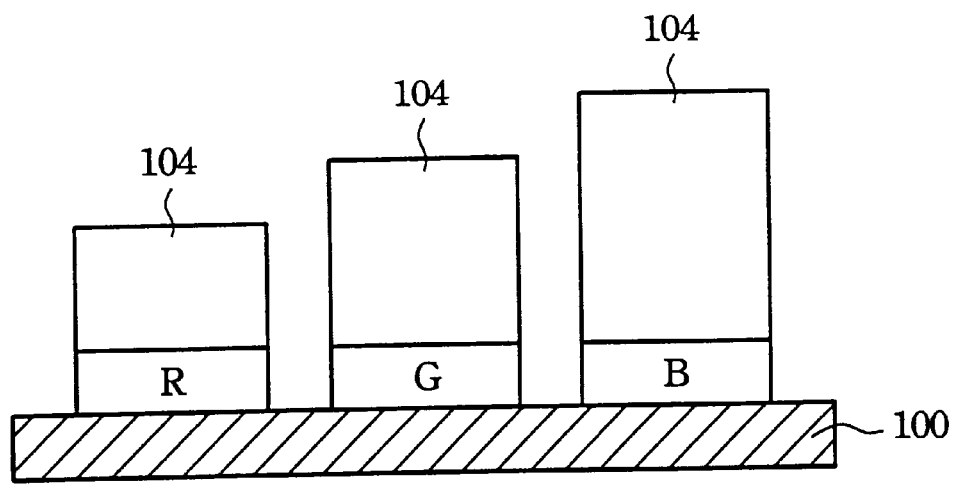
FIG. 6 is a cross sectional view of a color filter plate illustrating the step of developing the photoresist in accordance with the present invention.
Figure 7:
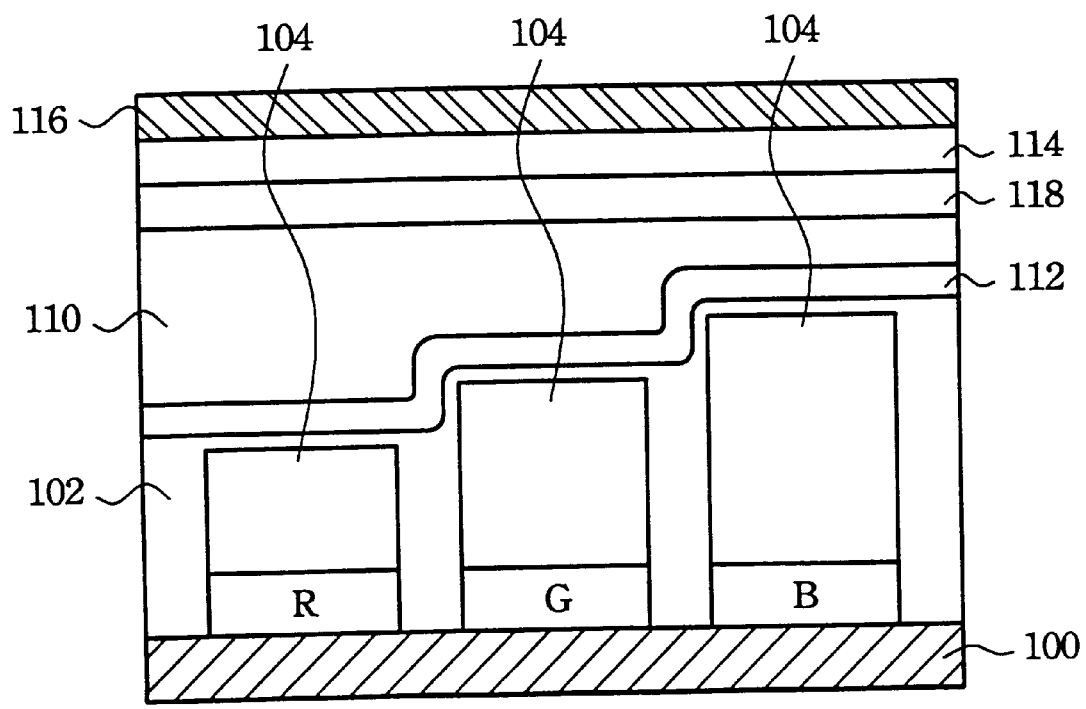
FIG. 7 is a cross sectional view of a color filter plate illustrating the final structure in accordance with the present invention.

Then, the positive photoresist 104 is developed by conventional manner. The result of the present invention after the three exposure steps is shown in FIG. 6. As can be seen in the figure, the color filter plate according to the present invention has a multi-gap structure. Finally, an ITO (indium tin oxide) layer 102, an alignment film 112, liquid crystal 110, a further ITO 114, a further alignment film 118 and a further glass 116 are respectively formed by conventional technology, as shown in FIG. 7. However, it is not the feature of the present invention. Therefore, the color filter plate has difference gap spacing dR, dG and dB.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of forming a color filter plate for liquid crystal display, said method comprising:
   patterning color pixels including red, green and blue pixels on a glass substrate;
   forming a photoresist layer on said color pixels;
   exposing said photoresist with three difference intensities of an illumination such that regions of said photoresist respectively on said red pixel, said green pixel and said blue pixel are exposed by difference intensity; and
   developing said photoresist to form a multi-level structure on said color pixels.

2. The method of claim 1, wherein said photoresist on said red pixel is exposed with relatively high intensity of said illumination, said photoresist on said blue pixel being exposed with relatively low intensity of said illumination and said photoresist on said green pixel being exposed with intermediate intensity of said illumination between the ones of said red and said blue pixels.

3. A method of forming a color filter plate for liquid crystal display, said method comprising:
   patterning color pixels including red, green and blue pixels on a glass substrate;
   forming a photoresist layer on said color pixels;
   exposing said photoresist with three difference exposure time such that regions of said photoresist respectively on said red pixel, said green pixel and said blue pixel are exposed by difference time; and
   developing said photoresist to form a multi-level structure on said color pixels.

4. The method of claim 3, wherein said photoresist on said red pixel is exposed with relatively long exposure time, said photoresist on said blue pixel being exposed with relatively short exposure time and said photoresist on said green pixel being exposed with intermediate exposure time between the ones of said red and said blue pixels.

5. A method of forming a color filter plate for liquid crystal display, said method comprising:
   patterning color pixels including red, green and blue pixels on a glass substrate;
   forming a photoresist layer on said color pixels;
   exposing said photoresist with three steps with three difference intensities of an illumination and three exposure times such that said photoresist having multi-level structure on said color pixels after developing.

6. The method of claim 5, wherein said photoresist on said red pixel is exposed with relatively high intensity of said illumination, said photoresist on said blue pixel being exposed with relatively low intensity of said illumination and said photoresist on said green pixel being exposed with intermediate intensity of said illumination between the ones of said red and said blue pixels.

7. The method of claim 5, wherein said photoresist on said red pixel is exposed with relatively long exposure time, said photoresist on said blue pixel being exposed with relatively short exposure time and said photoresist on said green pixel being exposed with intermediate exposure time between the ones of said red and said blue pixels.

8. A method of forming a color filter plate for liquid crystal display, said method comprising:
   patterning color pixels including red, green and blue pixels on a glass substrate;
   forming a photoresist layer on said color pixels;
   performing a first exposure with a first illumination intensity to expose a portion of said photoresist on said red pixels;
   performing a second exposure with a second illumination intensity to expose a portion of said photoresist on said green pixels;
   performing a third exposure with a third illumination intensity to expose a portion of said photoresist on said green pixels, wherein said first illumination intensity being higher than said second illumination intensity, wherein said second illumination intensity being higher than said third illumination intensity; and
   developing said photoresist thereby generating a multi-level structure formed therein.

9. A method of forming a liquid crystal display, said method comprising:
   patterning color pixels including red, green and blue pixels on a glass substrate;

forming a photoresist layer on said color pixels;

performing a first exposure with a first illumination intensity to expose a portion of said photoresist on said red pixels;

performing a second exposure with a second illumination intensity to expose a portion of said photoresist on said green pixels;

performing a third exposure with a third illumination intensity to expose a portion of said photoresist on said green pixels, wherein said first illumination intensity being higher than said second illumination intensity, wherein said second illumination intensity being higher than said third illumination intensity;

developing said photoresist thereby generating a multi-level structure formed therein;

forming a indium tin oxide (ITO) on said photoresist having said multi-level structure;

forming a further indium tin oxide (ITO) on a further glass; and forming liquid crystal material between said two glasses.

10. A method of forming a color filter plate for liquid crystal display, said method comprising:

patterning color pixels including red, green and blue pixels on a glass substrate;

forming a photoresist layer on said color pixels;

performing a first exposure with a first exposure time to expose a portion of said photoresist on said red pixels;

performing a second exposure with a second exposure time to expose a portion of said photoresist on said green pixels;

performing a third exposure with a third exposure time to expose a portion of said photoresist on said green pixels, wherein said first exposure time being longer than said second exposure time, wherein said second exposure time being longer than said third exposure time; and developing said photoresist thereby generating a multi-level structure formed therein.

11. A method of forming a liquid crystal display, said method comprising:

patterning color pixels including red, green and blue pixels on a glass substrate;

forming a photoresist layer on said color pixels;

performing a first exposure with a first exposure time to expose a portion of said photoresist on said red pixels;

performing a second exposure with a second exposure time to expose a portion of said photoresist on said green pixels;

performing a third exposure with a third exposure time to expose a portion of said photoresist on said green pixels, wherein said first exposure time being longer than said second exposure time, wherein said second exposure time being longer than said third exposure time;

developing said photoresist thereby generating a multi-level structure formed therein;

forming a indium tin oxide (ITO) on said photoresist having said multi-level structure;

forming a further indium tin oxide (ITO) on a further glass; and forming liquid crystal material between said two glasses.

* * * * *